(12) United States Patent
Chen et al.

(10) Patent No.: US 10,305,363 B1
(45) Date of Patent: May 28, 2019

(54) CURRENT DOUBLING DC-DC CONVERTER WITH EFFICIENT SLEEP MODE

(71) Applicant: SEMICONDUCTOR COMPONENTS INDUSTRIES, LLC, Phoenix, AZ (US)

(72) Inventors: Gang Chen, Tai Po (HK); Michael A. Stapleton, Scottsdale, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/940,362

(22) Filed: Mar. 29, 2018

(51) Int. Cl.
*H02M 1/00* (2006.01)
*H02M 1/08* (2006.01)
*H02M 3/335* (2006.01)

(52) U.S. Cl.
CPC ......... *H02M 1/08* (2013.01); *H02M 3/33576* (2013.01); *H02M 2001/0032* (2013.01)

(58) Field of Classification Search
CPC . H02M 2001/0032; H02M 2001/0035; H02M 3/3353; H02M 3/22; H02M 3/24; H02M 3/28; H02M 3/285
USPC ...................................................... 363/15–26
See application file for complete search history.

(56) References Cited

U.S. PATENT DOCUMENTS

| | | | |
|---|---|---|---|
| 8,520,420 B2 * | 8/2013 | Jungreis | H02M 3/3376 363/17 |
| 2009/0110129 A1 * | 4/2009 | Yang | H02M 3/33592 375/354 |
| 2010/0165684 A1 * | 7/2010 | Chen | H02M 1/10 363/127 |
| 2017/0025961 A1 * | 1/2017 | Seeman | H02M 1/08 |

OTHER PUBLICATIONS

Sam Abdel-Rahman, "Design of Phase Shifted Full-Bridge Converter with Current Doubler Rectifier," Infineon Technologies North America (IFNA) Corp., Design Note DN Jan. 2013, V1.0, Jan. 2013, 20 pages.
Steve Mappus, "Current Doubler Rectifier Offers Ripple Current Cancellation," Texas Instruments Incorporated, Application Note SLUA323, Sep. 2004, 8 pages.

* cited by examiner

*Primary Examiner* — Alex Torres-Rivera
(74) *Attorney, Agent, or Firm* — Ramey & Schwaller, LLP

(57) ABSTRACT

Improved current doubling DC-DC converters having an efficient sleep mode. An illustrative converter embodiment includes: a transformer, first and second inductors coupled together at a first voltage output terminal, a reserve capacitor coupled to a second output voltage terminal, a primary switch array, a secondary switch array, and a controller. The first and second inductors each have a drive terminal coupled to a respective terminal of the transformer secondary. The primary switch array operates to convert an input voltage into forward voltage pulses and reverse voltage pulses on the transformer primary. The secondary switch array selectively couples the first inductor's drive terminal to either a charge terminal of the reserve capacitor or to the second voltage output terminal. The controller at least temporarily suspends operation of the primary switch array during a sleep mode, and uses the reserve capacitor to sustain a voltage at the first voltage output terminal.

17 Claims, 9 Drawing Sheets

US 10,305,363 B1

CURRENT DOUBLING DC-DC CONVERTER WITH EFFICIENT SLEEP MODE

CROSS-REFERENCE TO RELATED APPLICATIONS

The present application relates to co-pending application Ser. No. 15/940,299, titled "Fast response for current doubling DC-DC converter" and filed concurrently herewith by inventors Gang Chen and Michael Stapleton.

BACKGROUND

Power converters offer the ability to convert between different forms of electrical power, including from a direct current (DC) voltage at, say, 48 V to a DC voltage suitable for integrated electronics, e.g., 1.8 V. A variety of power converter designs are known and used, including the "current doubler" design shown in FIG. 1A, which offers an economical implementation with relatively high operating efficiency.

The design of FIG. 1A includes a primary switch array 101 in the form of a half bridge that alternately closes (turns "on") n-channel power MOSFETs P1 and P2 to convert the input DC voltage Vin into an alternating voltage Vp across the transformer primary. Capacitors C1 and C2 provide charge storage and close the current path through the transformer primary. (Parasitic inductances Lm and Lp are shown here to represent the magnetizing inductance and leakage inductance of the transformer core, respectively, and are included here for design evaluation purposes. However, with respect to the inventive embodiments disclosed herein below, it is contemplated that these inductance values may be deliberately adjusted via customization of the transformer design and/or augmented with discrete inductors to extend the operating range and to improve efficiency performance characteristics of the converter.)

Transformer T is a step-down transformer, meaning that the current flow in the transformer secondary is a magnified version of the current flow in the transformer primary even as the secondary voltage Vs is reduced by the same factor. The secondary current direction alternates in response to the alternation of the primary voltage Vp. In the secondary switch array, n-channel power MOSFETs S1 and S2 are turned "on" by default, connecting the drive terminals of inductors Ls1 and Ls2 to ground and thereby enabling any ongoing current flow through the inductors to continue charging the output capacitor Co via their common connection terminal. Transistor S1 opens (turns "off") while the secondary voltage Vs is positive, enabling Vs to boost the current flow through the drive terminal of inductor Ls1. Similarly transistor S2 opens while Vs is negative, enabling the current flow through the drive terminal of inductor Ls2 to be boosted. The current flows through inductors Ls1 and Ls2 can thereby be alternately boosted, thereby charging the output capacitor to an output voltage Vout (the difference between Voutp and Voutn). Current sensors generate current sense signals Is1 and Is2 that indicate the current flow through the inductors Ls1 and Ls2 respectively.

The design includes a controller 102 that generates switch control signals PWM_P1, PWM_P2, PWM_S1, PWM_S2, which may have digital logic levels. A gate driver 104 converts the switch control signals PWM_P1, PWM_P2 into gate signals for transistors P1 and P2, and gate driver 106 converts switch control signals PWM_S1, PWM_S2, into gate signals for transistors S1 and S2, respectively. (The transistors may require gate voltages well in excess of digital logic levels.)

Controller 102 generates the switch control signals in response to measurements of Vin, Vout (or, as illustrated, to Voutp and Voutn), Is1, and Is2. The controller includes a pulse-width-modulated (PWM) signal generator 107, which generates alternate pulses of the PWM_P1 and PWM_P2 switch control signals at a fixed frequency, but adjusts the width of the pulses as needed to regulate the output DC voltage Vout. (Note, however, that pulse widths are limited to at most 50% of the period, because P1 and P2 are not permitted to be closed at the same time.) Because the current sense signals Is1 and Is2 represent inductor-stored energy that is already enroute to the output capacitor, the generator 107 may employ them to increase stability and robustness of the feedback loop.

Inverters 108 cause the PWM_S1 and PWM_S2 switch control signals to be de-asserted when PWM_P1 and PWM_P2 are asserted, respectively, so that the energy applied to the transformer primary is suitably conveyed to inductor Ls1 or Ls2, respectively. Delay elements Ds introduce a small delay from the transitions of PWM_P1 and PWM_P2 to the transitions of PWM_S1 and PWM_S2. (Depending on design, the delay elements Ds may delay only upward transitions, downward transitions, or both types of transistions.) If set properly (e.g., by adaptive training), the delay elements enable soft-switching (e.g., zero-voltage switching (ZVS) or zero-current switching (ZCS)) of transistors S1 and S2, reducing switching-related power losses in the converter. Soft-switching techniques are well known to those in the art and need not be discussed in detail here.

FIG. 1B shows a current doubler design that includes a primary switch array 111 in the form of a full bridge to convert the input voltage Vin from a DC voltage to an alternating voltage Vp. The capacitors C1, C2 of FIG. 1A are replaced by n-channel power MOSFETs P3, P0. Transistors P1 and P0 are closed together to provide a forward current flow path through the transformer primary, and at alternate times transistors P2 and P3 are closed together to provide a reverse current flow path through the primary. A gate driver 114 converts the switch control signals into gate signals for transistors P0-P3, optionally including a phase shift (i.e., delay elements) to provide soft-switching for these transistors and thereby further reducing switching-related power losses in the converter. The secondary stage of the converter remains the same.

In both the half-bridge and full-bridge current doubler designs, the inductor currents are boosted alternately, and the boost rate is limited by the 50% maximum pulse width. This characteristic limits the converter's responsiveness to load transients. Further, in systems where reverse power transfer conditions may occur (e.g., a load release transient, or a fast controlled ramp-down), transistors S1 and S2 may have to sustain elevated voltages, necessitating the use of more expensive and potentially less-efficient components. It is desired to address these shortcomings without compromising the efficiency and economic advantages of a current doubler design.

SUMMARY

Accordingly, there are disclosed herein improved current doubling DC-DC converters having an efficient sleep mode. An illustrative converter embodiment includes: a transformer, first and second inductors coupled together at a first voltage output terminal, a reserve capacitor coupled to a second output voltage terminal, a primary switch array, a secondary switch array, and a controller. The first and second inductors each have a drive terminal coupled to a respective terminal of the transformer secondary. The primary switch array operates to convert an input voltage into forward voltage pulses and reverse voltage pulses on the transformer primary. The secondary switch array selectively couples the first inductor's drive terminal to either a charge terminal of the reserve capacitor or to the second voltage output terminal. The controller at least temporarily suspends operation of the primary switch array during a sleep mode, and uses the reserve capacitor to sustain a voltage at the first voltage output terminal.

An illustrative embodiment of a DC-DC conversion method includes: running in an active mode; and running in a sleep mode. Running in the active mode includes: operating a primary switch array to convert an input voltage into forward voltage pulses and reverse voltage pulses on a primary of a transformer having a secondary coupled between a drive terminal of a first inductor and a drive terminal of a second inductor, the first and second inductors each having a common terminal coupled to a first output voltage terminal; selectively coupling the first inductor's drive terminal to a charge terminal of a reserve capacitor or to a second output voltage terminal, the first inductor's drive terminal being coupled to the charge terminal at least during the forward voltage pulses; and selectively coupling the second inductor's drive terminal to the charge terminal of the reserve capacitor or to the second output voltage terminal, the second inductor's drive terminal being coupled to the charge terminal at least during the reverse voltage pulses. Running in the sleep mode includes: suspending operation of the primary switch array at least temporarily; and while the operation of the primary switch array is suspended, using charge from the reserve capacitor to sustain a voltage at the first output terminal.

An illustrative embodiment of a DC-CD converter manufacturing method includes: providing a transformer having a primary and a secondary, the secondary connected between a drive terminal of a first inductor and a drive terminal of a second inductor, the first and second inductors each having a common terminal coupled to a first output voltage terminal; connecting a first set of switches to the first inductor's drive terminal, the first set of switches operable to selectively couple the first inductor's drive terminal to a charge terminal of a reserve capacitor or a second output voltage terminal; connecting a second set of switches to the second inductor's drive terminal, the switches operable to selectively couple the second inductor's drive terminal to the charge terminal or the second output voltage terminal; connecting a primary switch array to the transformer primary; and controlling the primary switch array and the first and second sets of switches with a controller having a mode signal that causes the controller to run in an active mode during normal operations and in a sleep mode during low power operations, wherein during the sleep mode, the controller at least temporarily suspends operation of the primary switch array and the second set of switches, and employs charge from the reserve capacitor to sustain a voltage at the first voltage output terminal.

Each of the foregoing embodiments may be employed individually or conjointly, and they may further employ one or more of the following optional features in any suitable combination: 1. the secondary switch array further selectively couples the first and second inductor's drive terminal to either the charge terminal or the second voltage output terminal. 2. the secondary switch array includes a first set of switches coupled to the first inductor's drive terminal and a second set of switches coupled to the second inductor's drive terminal. 3. during the sleep mode the controller at least temporarily suspends operation of the second set of switches while continuing to drive operation of the first set of switches. 4. during the sleep mode the controller periodically drives operation of the primary switch array and the second set of switches to recharge the reserve capacitor. 5. during the sleep mode the controller suspends operation of the second set of switches while continuing to drive operation of the first set of switches. 6. the converter further comprises an auxiliary converter that, during the sleep mode, periodically recharges the reserve capacitor. 7. during the sleep mode the controller suspends operation of the secondary switch array. 8. the converter further comprises a first auxiliary converter that, during the sleep mode, draws power from the reserve capacitor to sustain the voltage at the first voltage output terminal. 9. the first auxiliary converter is a buck converter. 10. the converter further comprises a second auxiliary converter that, during the sleep mode, periodically recharges the reserve capacitor. 11. the selective coupling of the first inductor's drive terminal is performed with a first set of switches, and the selective coupling of the second inductor's drive terminal is performed with a second set of switches. 12. said using charge from the reserve capacitor is performed with the first set of switches, and running in the sleep mode further includes: suspending operation of the second set of switches at least temporarily. 13. running in the sleep mode further includes periodically operating the primary switch array and the second set of switches to recharge the reserve capacitor. 14. running in the sleep mode further includes: suspending operation of the second set of switches, and periodically recharging the reserve capacitor with an auxiliary converter. 15. running in the sleep mode further includes: suspending operation of the first and second sets of switches, and said using charge from the reserve capacitor is performed using a first auxiliary converter. 16. running in the sleep mode further includes periodically recharging the reserve capacitor with a second auxiliary converter. 17. providing a first auxiliary converter operable during the sleep mode to sustain the voltage at the first voltage output terminal using charge from the reserve capacitor. 18. providing a second auxiliary converter operable during the sleep mode to periodically recharge the reserve capacitor.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Figure 1A:
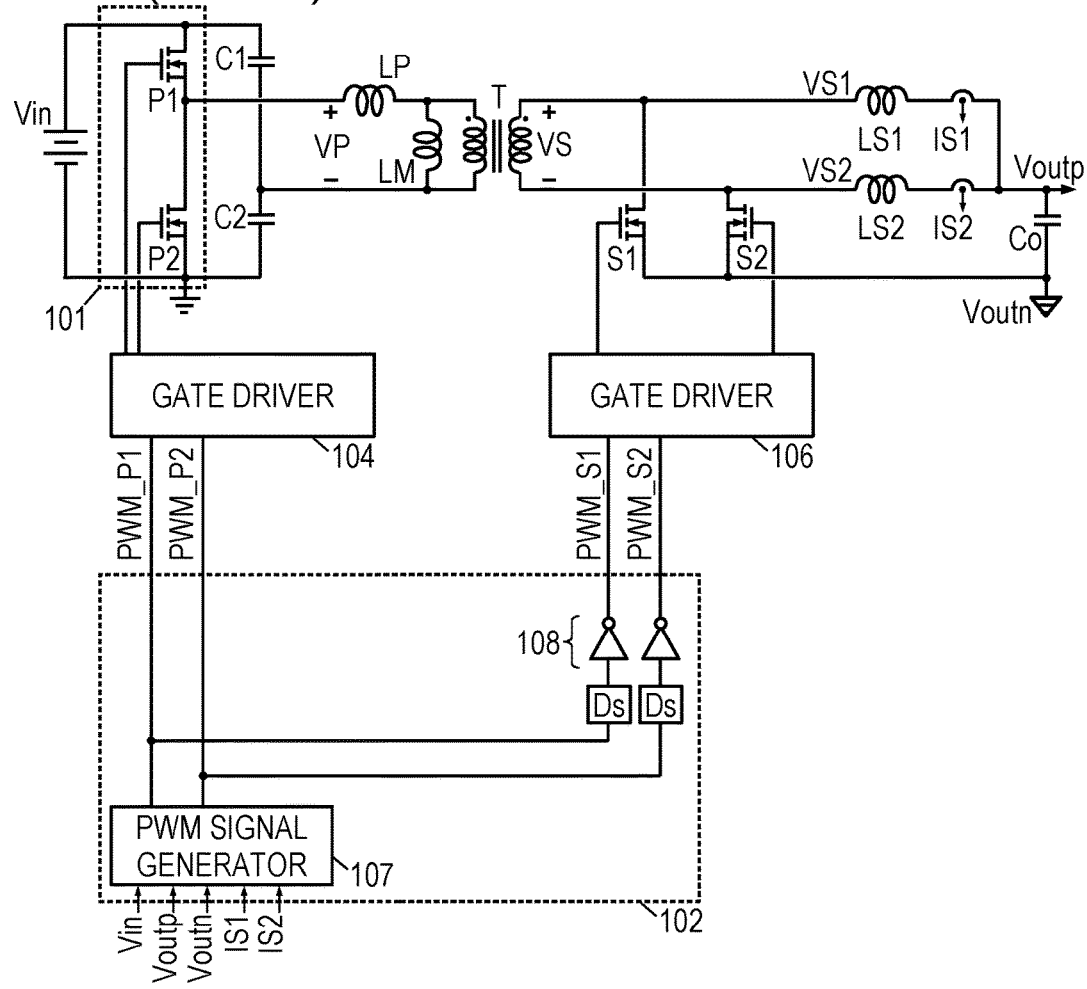
FIG. 1A is a schematic of a half-bridge driven DC-DC converter.
Figure 1B:
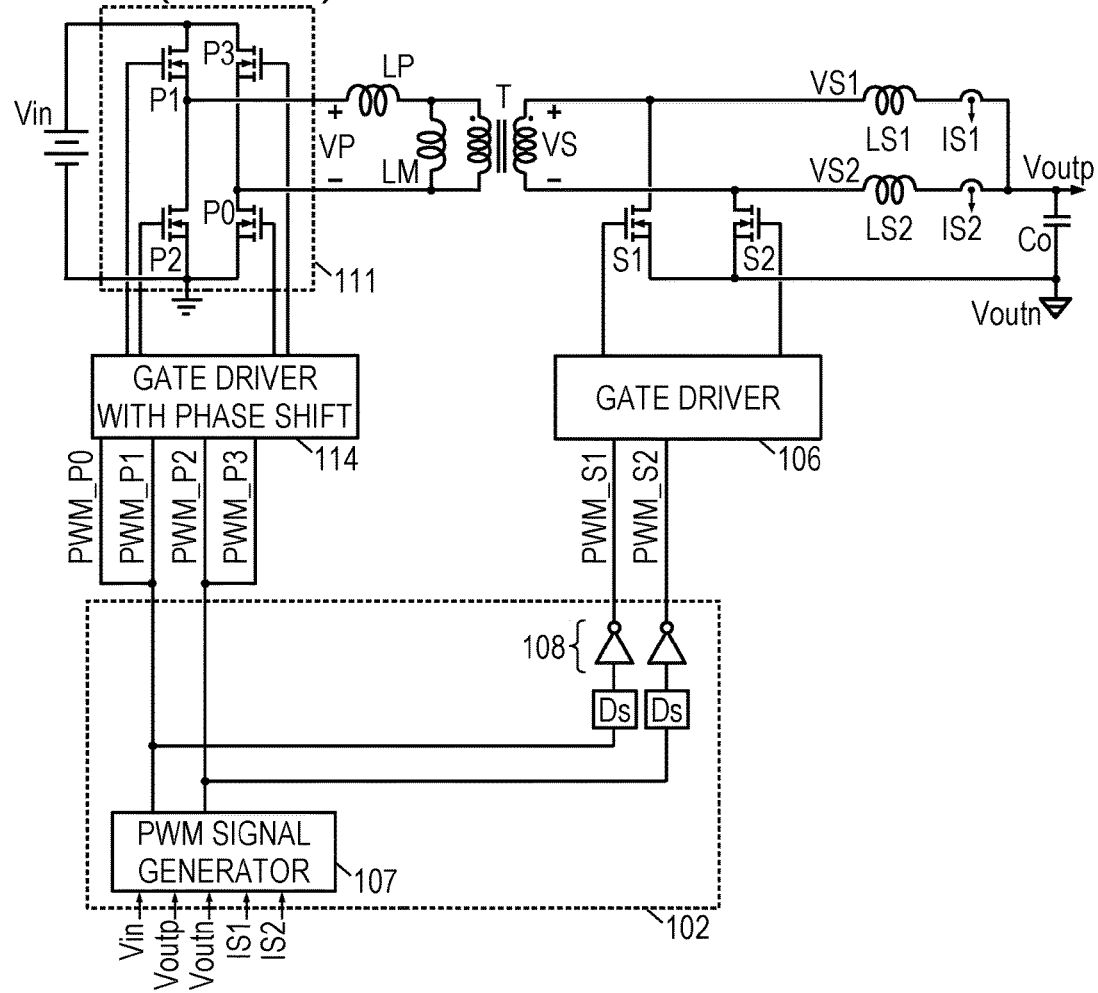
FIG. 1B is a schematic of a full-bridge driven DC-DC converter.
Figure 2A:
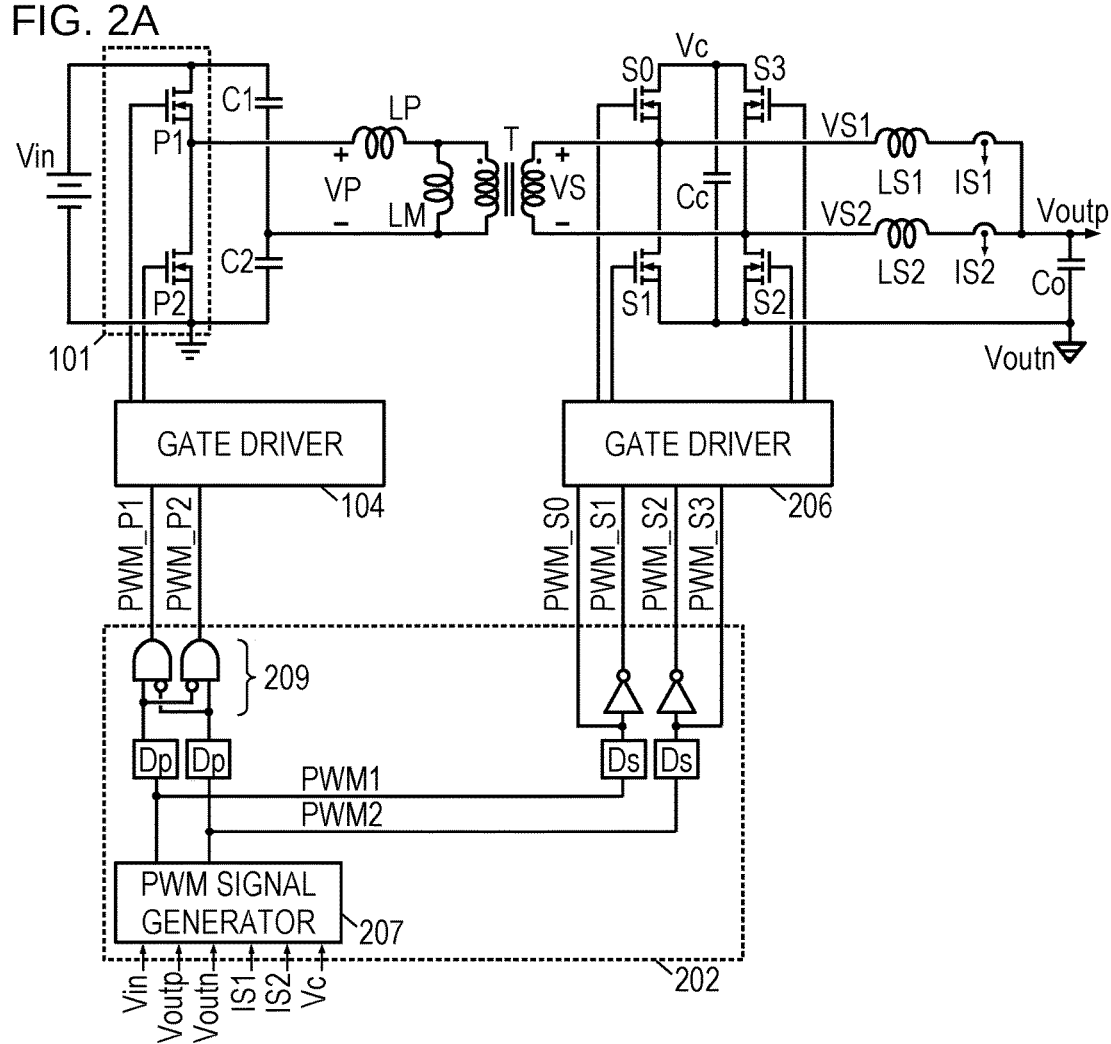
FIG. 2A is a schematic of an illustrative half-bridge driven fast-response current doubling DC-DC converter.

FIG. 2A is a schematic of a current doubling DC-DC converter that operates using similar principles as the design of FIG. 1A, but further includes a reserve capacitor Cc and an augmented secondary switch array (S0-S3). As with the designs of FIGS. 1A-1B, transistors S1 and S2 are "on" by default to connect the drive terminals of inductors Ls1 and Ls2 to the negative output voltage terminal, enabling any ongoing current flow through the inductors to continue directing current to the positive output voltage terminal and thereby charging the output capacitor Co. Aside from minor timing delays that may be introduced by controller 202 or gate driver 206 to provide soft switching, transistor S0 is open when S1 is closed, and closed when S1 is open. Similarly, transistor S3 is open when S2 is closed, and closed when S2 is open. Consequently, the secondary switch array switches the drive terminal of inductor Ls1 between the negative output voltage terminal (to provide continued charging of the output capacitor) and the charge terminal of the reserve capacitor (to boost the current flow and, during normal operation, to charge and maintain the voltage on the reserve capacitor). Similarly, the secondary switch array switches the drive terminal of inductor Ls2 between the negative output voltage terminal and the charger terminal of the reserve capacitor.

Controller 202 includes a pulse width modulated (PWM) signal generator 207 that, in addition to responding to measurements of Vin, Vout, and the current sense signals Is1, Is2, further accounts for the reserve capacitor voltage Vc when determining the duty cycle of signals PWM1 and PWM2. Though described in detail with respect to FIG. 3, we note here that the PWM signal generator 207 reduces or increases the duty cycles of the PWM1 and PWM2 signals to regulate Vout, the voltage on output capacitor Co. Controller 202 may further include gating logic 209 that permits at most one of the PWM_P1 and PWM_P2 switch control signals to be asserted at a given time, and which in the illustrated embodiment causes both switch control signals to be disabled if both PWM1 and PWM2 are asserted concurrently. With such gating logic preventing transistors P1 and P2 from being on at the same time, the PWM signal generator 207 can be designed to exceed the 50% duty cycle limit of FIGS. 1A-1B, and indeed, can take the duty cycle of PWM1 and PWM2 to 100% if desired.

Though the illustrated embodiment disables the primary switch array when assertions of PWM1 and PWM2 overlap, the reserve capacitor Cc is available to boost current flow through either or both of the inductors Is1 and Is2, with the duty cycle limited only by the size of the reserve capacitor. The embodiment of FIG. 2A thereby enables a fast response to load transients. Further, in reverse power transfer situations, the reserve capacitor Cc is available for storing and smoothing the power transfer. Illustrative reverse power transfer situations may include load release transients and fast, controlled ramping down of the output voltage. In such situations, the designs of FIGS. 1A-1B may expose the transistors of the secondary switch array to high voltage stresses, which would necessitate the use of more robust, expensive transistors in the secondary switch array. In contrast, the embodiments having the reserve capacitor are able to limit the voltages to which the secondary switch array transistors are exposed, thereby enabling the use of transistors with lower voltage ratings.

Controller 202 includes delay elements Ds to introduce a small delay between switching of the primary switch array transistors and the secondary switch array transistors, providing for soft switching and hence more efficient energy conversion during normal operation. (During normal operation, delay elements Dp may be bypassed.) The small Ds delays may be preset or may be determined adaptively by the controller based on the current level in the first and second inductors. During reverse power transfer situations, delay elements Ds may be bypassed and delay elements Dp employed to introduce a small delay between the switching of the secondary switch array transistors and the primary switch array transistors, providing for soft switching and more efficient energy transfer to the converter's input terminals. The small Dp delay may be preset or may be determined adaptively by the controller based on the current level in the first and second inductors. Note that the delay elements Ds and Dp may provide different delays for upward transitions and downward transitions as needed to minimize switching losses and conduction losses.

Figure 2B:
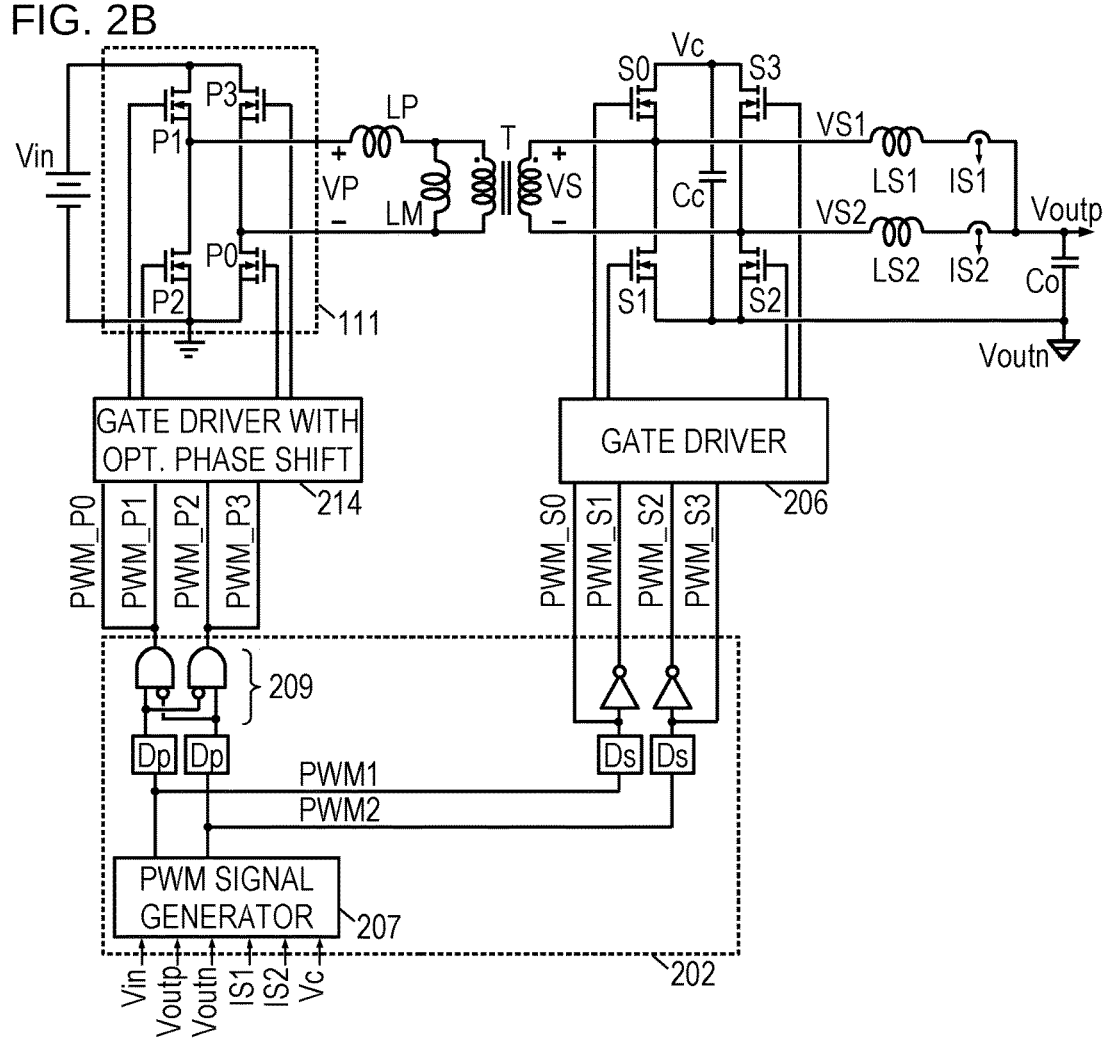
FIG. 2B is a schematic of an illustrative full-bridge driven fast-response current doubling DC-DC converter.

FIG. 2B is a schematic of a fast response current doubling DC-DC converter having the primary switch array in the form of a full bridge. Gate driver 214 operates in a similar fashion as gate driver 114 (FIG. 1B), but may or may not provide a phase shift for soft switching.

Figure 2C:
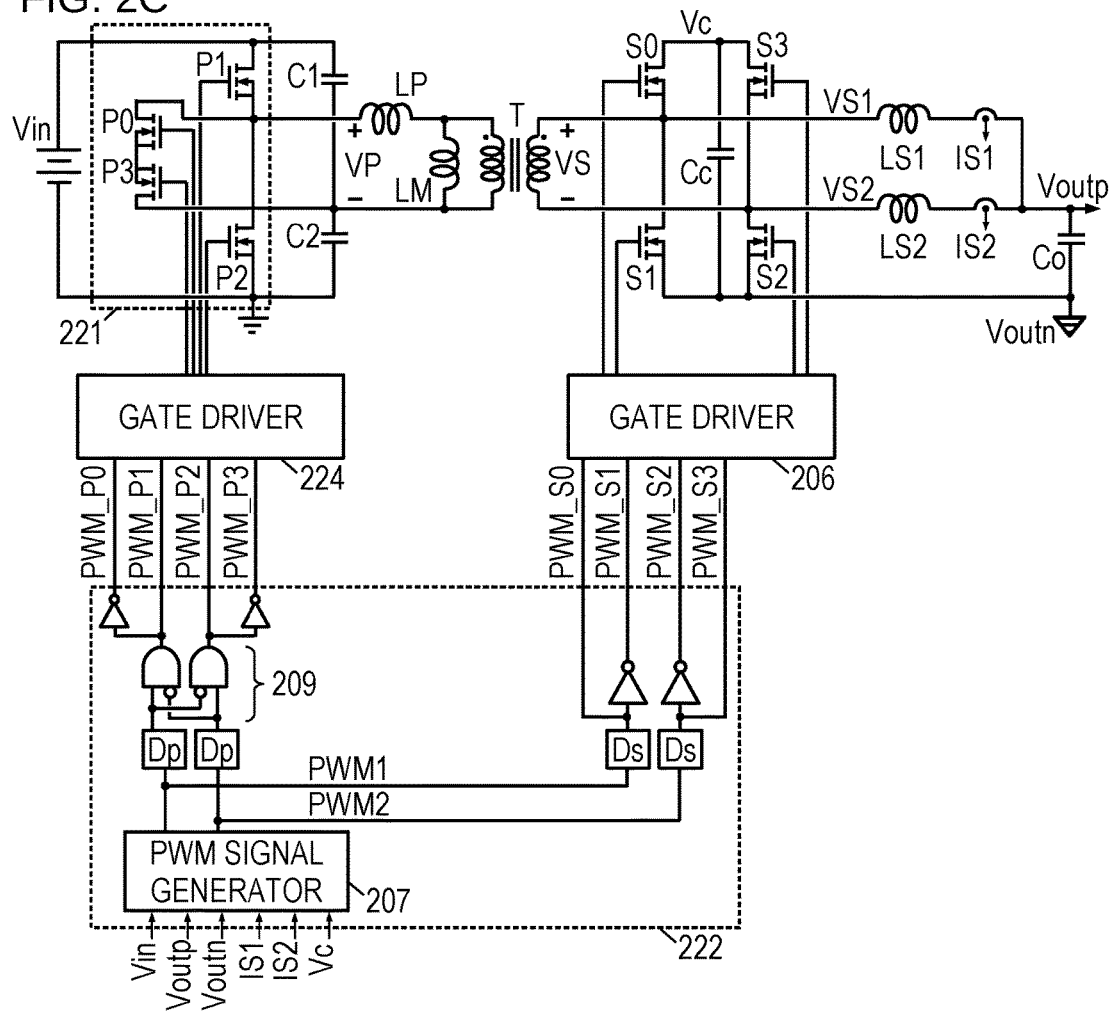
FIG. 2C is a schematic of an illustrative fast-response current doubling DC-DC converter with zero-voltage switched half-bridge driver.

FIG. 2C is a schematic of a fast response current doubling DC-DC converter having a primary switch array 221 in the form of a half bridge configured for zero voltage switching (ZVS), as contrasted with the embodiment of FIG. 2A which would employ zero current switching (ZCS) when the transformer primary current drops to zero. In the embodiment of FIG. 2C, transistor P0 is open when P1 is closed and closed when P1 is open. Transistor P3 is open when P2 is closed and closed when P2 is open. Thus, when P1 and P2 are off, transistors P0 and P3 provide a circulation path for the current through the transformer primary, and help transistors P1 and P2 achieve zero voltage switching.

Figure 3:
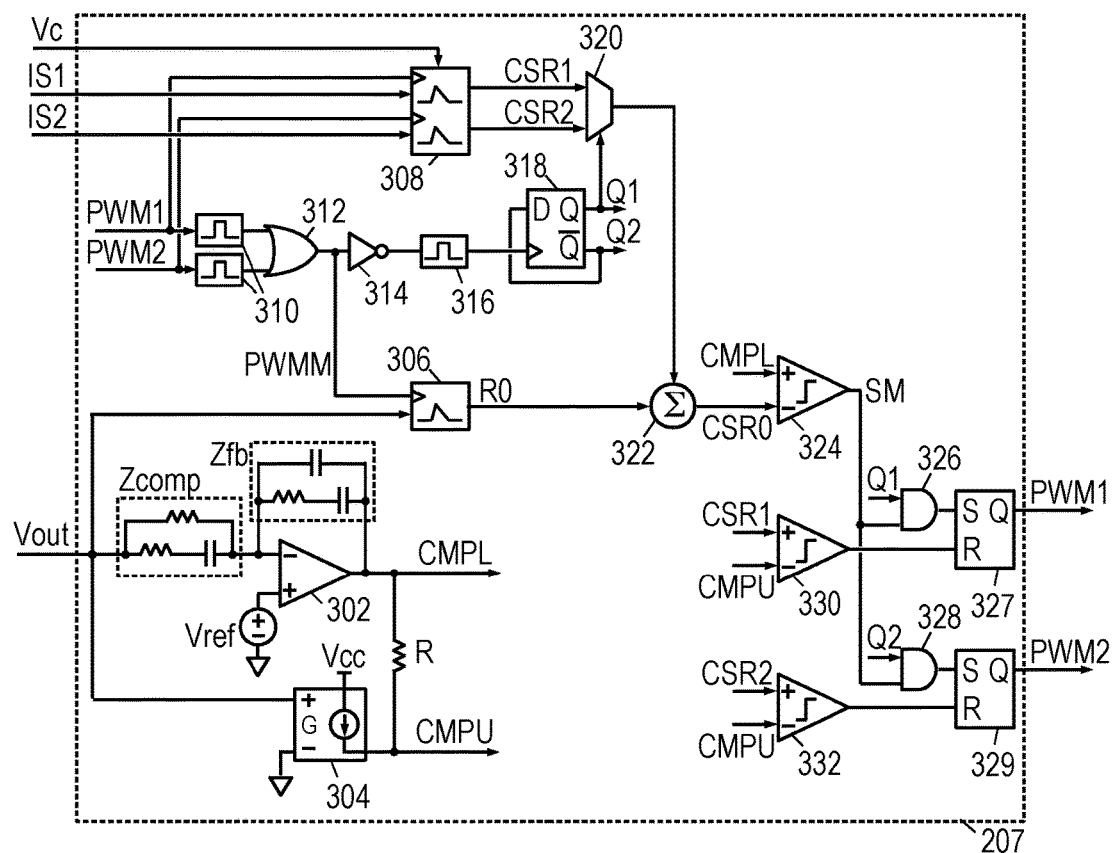
FIG. 3 is a schematic of an illustrative pulse-width modulated signal generator.

FIG. 3 is a schematic of an illustrative PWM signal generator 207 that may be used with each of the embodiments in FIGS. 2A-2C. In the illustrated generator 207, an error amplifier 302 receives at its inverting input a filtered version of the DC-DC converter output voltage Vout via a compensation filter Zcomp, and receives at its noninverting input a reference voltage Vref. The error amplifier amplifies the difference between its inverting and noninverting input with a gain and phase that is determined by the feedback impedance Zfb and Zcomp. The amplified difference is made available as an error signal labeled lower comparator threshold (CMPL), which rises as the filtered output voltage falls below a target value. An upper comparator threshold (CMPU) signal is generated by a voltage-controlled current source 304, which drives a current through resistance R to generate a voltage-shifted version of CMPL. The margin between CMPU and CMPL is proportional to the output voltage Vout, but aside from transient effects CMPU generally follows CMPL, rising as the filtered output voltage falls below the target value.

The signal generator includes descending ramp generator 306. When triggered, ramp generator 306 quickly raises the voltage of ramp signal R0 to a preset value and linearly decreases R0 at a rate proportional to the output voltage Vout until the ramp reaches a minimum value. Though current sense unit 308 masquerades as a pair of ramp generators, ramp signal CSR1 is representative of the current flow through inductor Ls1 (relative to an initial set point when the unit is triggered) and thus increases smoothly as the current is boosted and decreases smoothly as the inductor's drive terminal is coupled to ground enabling continued flow of the charging current. Similarly, ramp signal CSR2 is representative of the current flow through inductor Ls2, relative to an initial set point when the unit is triggered. The current sense unit 308 may adjust a slope of the ramp signals CSR1, CSR2 based on the reserve capacitor voltage Vc, increasing the slope as voltage Vc increases.

The triggers for ramp generator 306 and current sense unit 308 are based on the output signals PWM1 and PWM2 from the PWM signal generator 207. PWM1 is the trigger signal for providing ramp signal CSR1, while PWM2 is the trigger signal for providing ramp signal CSR2. Comparator 330 compares ramp signal CSR1 to the upper comparator threshold CMPU, asserting a reset input of S-R flip-flop 327 when the ramp signal exceeds the threshold, and thereby deasserting PWM1. Similarly, comparator 332 compares ramp signal CSR2 to CMPU, resetting S-R flip-flop 329 when the ramp signal exceeds the threshold, thereby deasserting PWM2. In other words, ramp signals CSR1, CSR2 control the reset timing of PWM1 and PWM2, respectively.

A pair of one-shot elements (aka monostable multivibrators) 310 each generate a pulse in response to an upward transition in PWM1, PWM2, and a logical OR gate 312 combines the pulse signals to provide a multiplexed trigger signal PWMM having a fixed or minimum pulse width. PWMM serves as the trigger signal for ramp generator 306, which in combination with a selected one of the CSR1, CSR2 ramp signals, controls the onset timing of the PWM1 and PWM2 signals. Logical NOT gate 314 inverts the PWMM signal, and a one-shot element 316 essentially introduces a fixed delay in the inverted PWMM signal before supplying it as a clock signal to D-type flip-flop 318. Flip-flop 318 is configured to toggle from high-to-low or low-to-high, alternately with each assertion of the clock signal. The delayed clocking of flip-flop 318 imposes a maximum limit on the switching frequency of PWM1, PWM2.

The non-inverted output signal Q1 is supplied as a selection signal to multiplexer 320, which forwards the selected one of ramp signals CSR1 and CSR2 to summing element 322. (When Q1 is asserted, CSR1 is selected, and when it is deasserted, CSR2 is selected.) Q2 is the logical complement of Q1. Summing element 322 adds the selected one of ramp signals CSR1 and CSR2 to the ramp signal R0 from ramp generator 306, producing a combined ramp signal CSR0. Comparator 324 compares the combined ramp signal CSR0 to the lower comparator threshold CMPL, asserting a multiplexed set signal SM when CSR0 falls below CMPL. If Q1 is asserted (and CSR0 is the sum of R0 and CSR1), a logical AND gate 326 forwards the multiplexed set signal SM to S-R flip-flop 327, causing PWM1 to be asserted. Conversely, if Q2 is asserted (and CSR0 is the sum of R0 and CSR2), logical AND gate 328 forwards SM to S-R flip-flop 329, causing PWM2 to be asserted.

Ramp generator 306 operates to ensure that alternate assertions of PWM1, PWM2 do occur at some minimum frequency. To close the loop, recall that assertions of PWM1 or PWM2 cause the respective CSR1, CSR2 ramp signal to begin increasing, eventually leading to a reset of the asserted PWM1, PWM2 signal as the current through the corresponding inductor reaches its target value. Further, assertions of PWM1 or PWM2 cause D flip-flop 318 to toggle, such that comparator 324 can determine whether the other PWM1, PWM2 signal should be asserted. It is possible for both PWM1 and PWM2 to be asserted concurrently.

Controller 207 is thus a 2-phase PWM controller that senses and regulates the output voltage to follow a reference voltage. The target level for output voltage Vout can be quickly adjusted by adjusting the reference voltage Vref for error amplifier 302, enabling the output voltage to be quickly set and maintained over a sizeable voltage range. Because the PWM controller is capable of generating a pulse overlap between the two PWM signals during a fast transient, the currents in the two inductors can be quickly pumped up together by the energy stored in the reserve capacitor.

Figure 4:
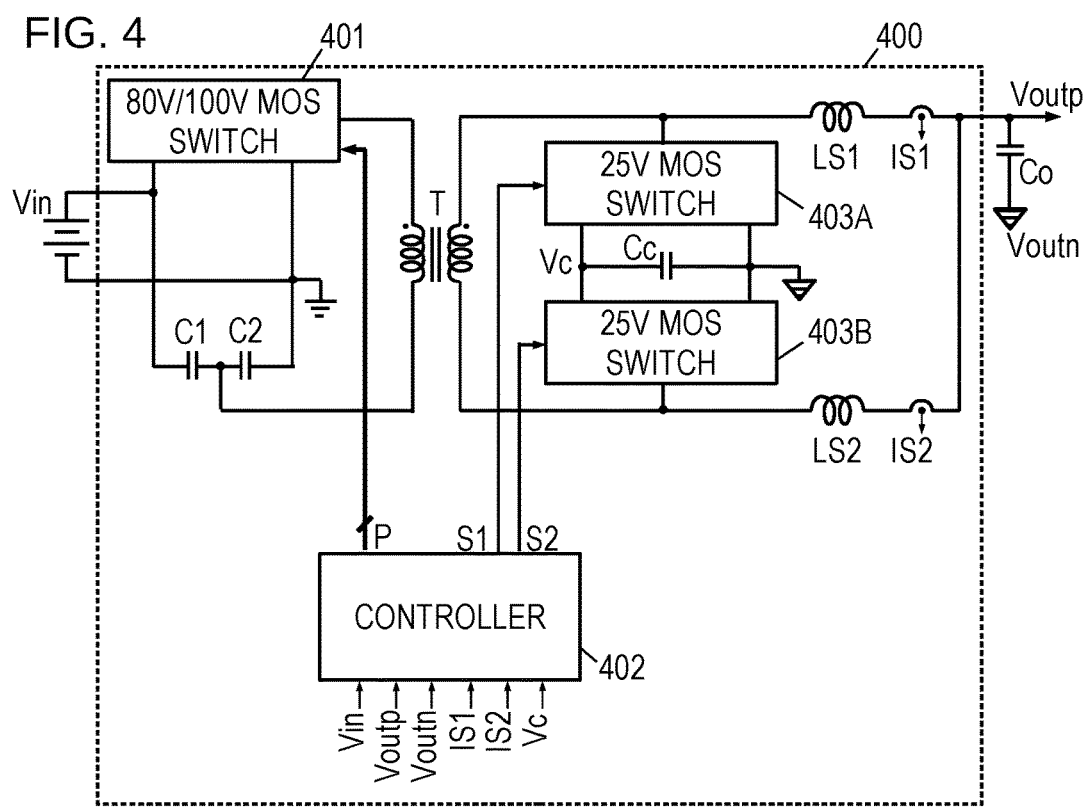
FIG. 4 is a schematic of an illustrative power supply.

FIG. 4 is a schematic of an illustrative power supply 400 employing the foregoing principles. A controller 402 provides a set of primary switch control signals P to a primary switch array 401 to convert a DC input voltage to an alternating voltage across a transformer primary. In the illustrated embodiment, primary switch array 401 includes power MOSFETs able to switch 80 or 100 volts, depending on the system specifications, for a nominal input voltage of 48V (with an expected actual voltage in the range from about 36 to 60 volts). The controller further provides a set of secondary switch control signals S1, S2, to a secondary switch array including power MOSFET switches 403A, 403B, each able to switch 25 volts for a nominal 1.25V/50 A output voltage/current (with an expected actual voltage in the range from about 0.5 to 2 volts). Because lower-voltage-rated switches are used in the secondary switch array, higher efficiencies can be achieved. For higher output current requirements, multiple converters may be arranged in parallel.

We note here that because the disclosed DC-DC converters include a reserve capacitor Cc, there exist opportunities for further improvement of the operating efficiency. More specifically, because the reserve capacitor provides intermediate energy storage that may be sufficient by itself to maintain the output voltage Vout for a time, the controller can temporarily or periodically suspend switching of the primary switch array during light-load conditions to further reduce switching losses and thereby improve efficiency. When primary switch array operation switching is suspended, the controller may be said to be in a "Sleep" mode, as opposed to an "Active" mode where the primary switch array is being employed to supply power via the transformer.

Figure 5A:
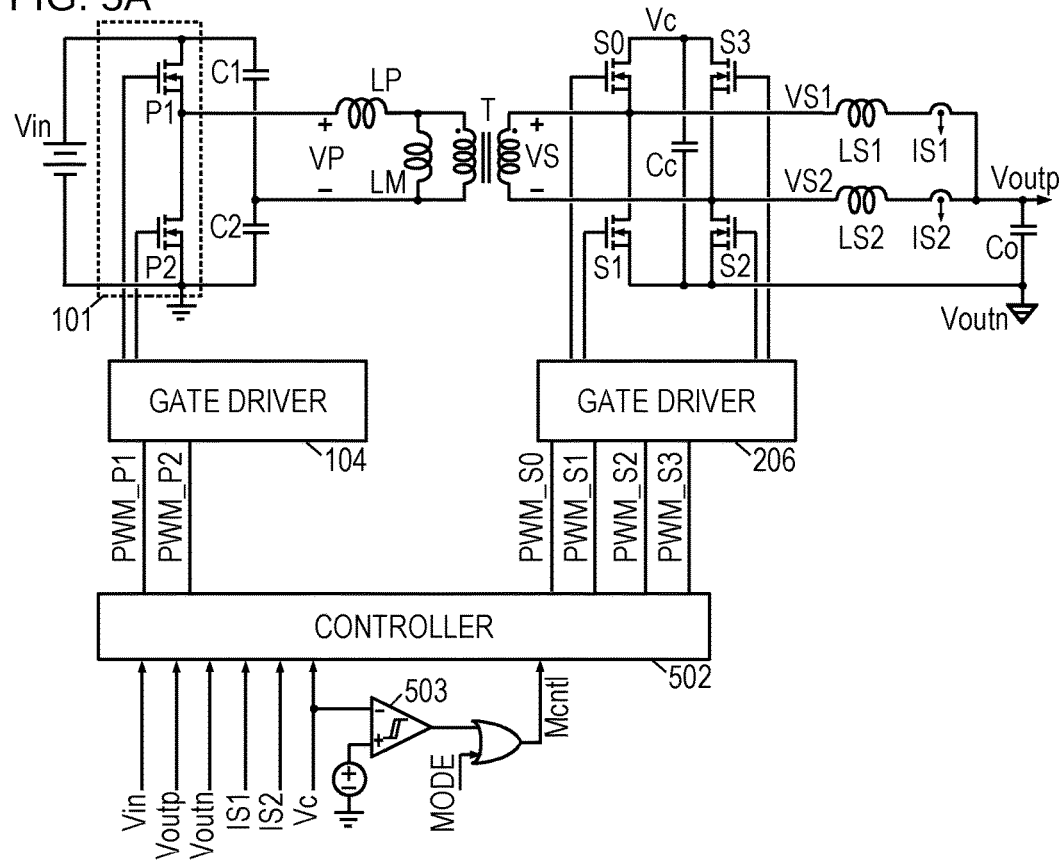
FIG. 5A is a schematic of an illustrative mode-controlled DC-DC converter.

FIG. 5A is a schematic of an illustrative mode-controlled DC-DC converter, which resembles the schematic of FIG. 2A but includes a controller 502 with mode control support. When the mode control input Mcntl of controller 502 is asserted, the controller 502 operates in an active mode, driving the primary and secondary switch control signals to convey power from the input voltage Vin to the reserve capacitor Cc and to the output capacitor Co. When the mode control input Mcntl is deasserted, the controller 502 operates in a sleep mode, keeping primary switch control signals in a deasserted state to disable power transfer via the transformer. In the sleep mode, controller 502 drives the secondary switch control signals to convey power as needed from reserve capacitor Cc to the output capacitor Co. In an illustrative embodiment, the controller 502 continues driving secondary switch control signals PWM_S0 and PWM_S1 to emulate a single-phase buck converter, and keeps secondary switch control signals PWM_S2 and PWM_S3 deasserted. Because fewer components are being operated during light-load conditions, higher efficiencies are achieved. Further, the single-phase buck converter may be able to operate in a continuous conduction mode (CCM) for further efficiency improvement, though discontinuous conduction mode (DCM) can be automatically employed to conserve power.

The schematic of FIG. 5A includes a comparator 503 that compares the reserve capacitor voltage Vc to a reference voltage, asserting a wake-up signal when Vc falls below the reference voltage. A logical OR gate asserts the mode control input Mcntl if either the wake-up signal or a MODE input signal is asserted, causing the controller 502 to enter the active mode. The MODE input signal may be externally sourced by, e.g., a user-operable button, or by a system element that determines when output power requirements are reduced. Alternatively, the controller 502 may automatically detect when output power requirements are below a threshold and generate the MODE signal internally.

Figure 5B:
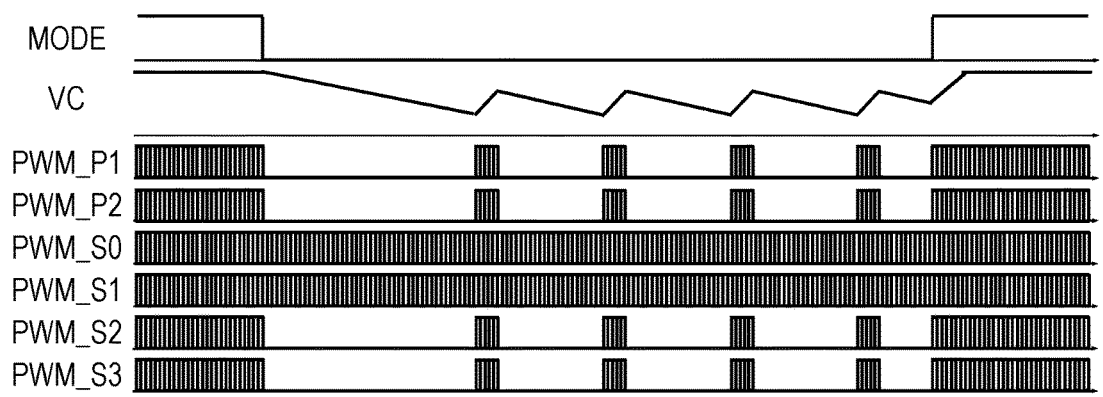
FIG. 5B is a timing diagram for an illustrative mode controlled DC-DC converter.

FIG. 5B provides an illustrative timing diagram to illustrate the operation of the mode-controlled DC-DC converter of FIG. 5A. When the MODE signal is asserted, the primary and secondary switch control signals are driven to convey power from Vin to Vout, maintaining reserve capacitor voltage Vc at a desired level that supports a fast response to any load transients. When the MODE signal is de-asserted, primary switch control signals PWM_P1, PWM_P2, and secondary switch control signals PWM_S2, PWM_S3 are disabled until such time as the reserve capacitor voltage falls below the reference voltage (FIG. 5A). Secondary switch control signals PWM_S0, PWM_S1 switch in a complementary fashion to emulate a buck converter, transferring power as needed from reserve capacitor Cc to output capacitor Co. Once the reserve capacitor voltage Vc falls below the reference voltage, the Mcntl signal is asserted until the hysteresis of comparator 503 is overcome, returning the controller 502 to active mode for long enough to restore some charge to the reserve capacitor. (In an alternative embodiment, a one-shot element is used to determine the recharge time for the reserve capacitor.) Controller 502 thus minimizes switching power losses while the MODE signal is deasserted, and returns to active mode when the MODE signal is again asserted.

Figure 6A:
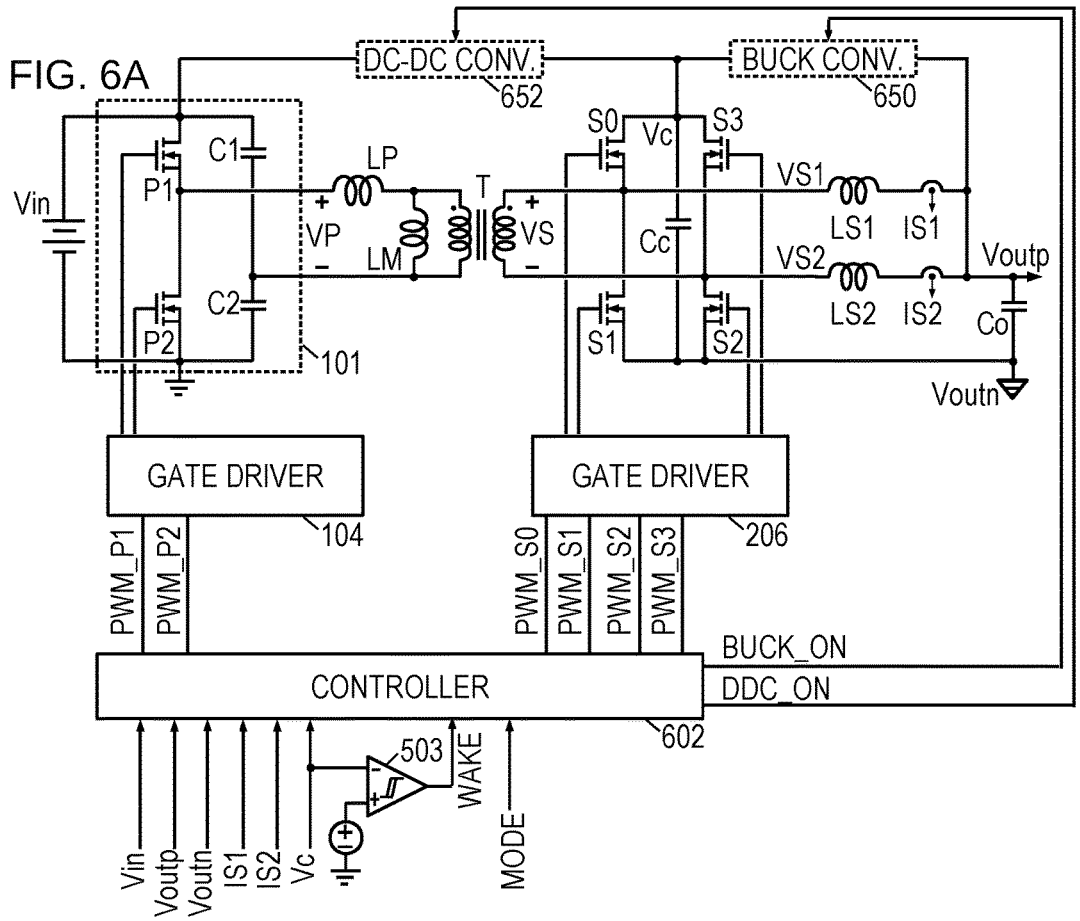
FIG. 6A is a schematic of a mode-controlled DC-DC converter with optional auxiliary converters.
Figure 6B:
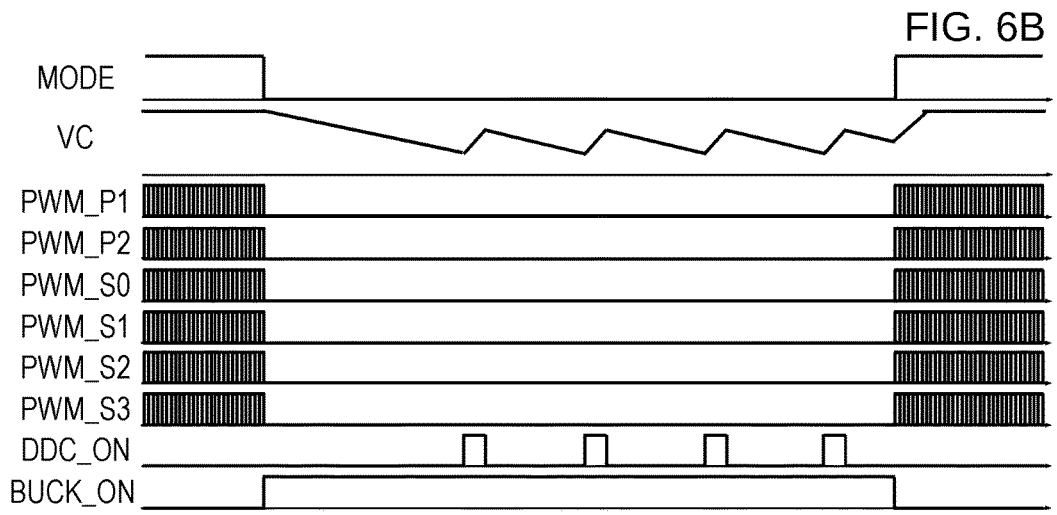
FIG. 6B is a timing diagram for an illustrative mode controlled DC-DC converter with auxiliary converters.

FIG. 6A is a schematic of an alternative mode-controlled DC-DC converter embodiment employing one or more auxiliary converters 650, 652. The auxiliary converters may support additional efficiency gains by being optimized for low-power operation. In the embodiment of FIG. 6A, controller 602 drives the primary and secondary switch control signals only when the MODE signal is asserted, and de-asserts the primary and secondary switch control signals when the MODE signal is de-asserted, as shown in FIG. 6B. To convey power from the reserve capacitor Cc to the output capacitor Co during sleep mode, the controller 602 enables auxiliary buck converter 650, or some other form of low-power optimized DC-DC converter. Rather than periodically re-entering an active mode when the reserve capacitor voltage falls below the reference voltage, the controller 602 may enable an auxiliary DC-DC converter 652 to periodically recharge the reserve capacitor. As with auxiliary converter 650, converter 652 may be optimized for low power operation.

In an alternative embodiment having only one auxiliary converter 650, which handles the transfer of power from reserve capacitor Cc to output capacitor Co, the periodic recharging of the reserve capacitor may be performed by briefly re-entering active mode as described with reference to FIGS. 5A-5B. In yet another alternative embodiment having only one auxiliary converter 652, which handles the periodic recharging of the reserve capacitor, the transfer of power from reserve capacitor Cc to output capacitor Co is performed by a subset of the secondary switch array emulating a buck converter as described with reference to FIGS. 5A-5B.

The foregoing embodiments are thus able to reduce response times to load transients while shielding the secondary switch array from high voltage stress attributable to reverse power transfer conditions. Efficiency enhancements are achievable with soft switching and mode control, making it possible to provide a high-efficiency converter in a small form factor.

The foregoing embodiments may omit complicating factors such as parasitic impedances, current-limiting resistors, level-shifters, line clamps, etc., which may be present but do not meaningfully impact the operation of the disclosed circuits. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A current doubling DC-DC converter that comprises:
an output capacitor coupled between a first output voltage terminal and a second output voltage terminal;
a transformer having a primary and a secondary;
first and second inductors coupled together at the first output voltage terminal, the first and second inductors each having a drive terminal coupled to a respective terminal of the transformer secondary;
a reserve capacitor coupled to the second output voltage terminal, the reserve capacitor having a charge terminal;
a primary switch array that operates to convert an input voltage into forward voltage pulses and reverse voltage pulses on the transformer primary;
a secondary switch array that selectively couples the first inductor's drive terminal to the charge terminal and to the second output voltage terminal; and
a controller that at least temporarily suspends operation of the primary switch array during a sleep mode, causing the reserve capacitor to sustain a voltage at the first output voltage terminal,
wherein the secondary switch array further selectively couples the second inductor's drive terminal to either the charge terminal or the second output voltage terminal,
wherein the secondary switch array includes a first set of switches coupled to the first inductor's drive terminal and a second set of switches coupled to the second inductor's drive terminal, and
wherein during the sleep mode the controller at least temporarily suspends operation of the second set of switches while continuing to drive operation of the first set of switches.

2. The converter of claim 1, wherein during the sleep mode the controller periodically drives operation of the primary switch array and the second set of switches to recharge the reserve capacitor.

3. A current doubling DC-DC converter that comprises:
an output capacitor coupled between a first output voltage terminal and a second output voltage terminal;
a transformer having a primary and a secondary;
first and second inductors coupled together at the first output voltage terminal, the first and second inductors each having a drive terminal coupled to a respective terminal of the transformer secondary;
a reserve capacitor coupled to the second output voltage terminal, the reserve capacitor having a charge terminal;
a primary switch array that operates to convert an input voltage into forward voltage pulses and reverse voltage pulses on the transformer primary;
a secondary switch array that selectively couples the first inductor's drive terminal to the charge terminal and to the second output voltage terminal; and
a controller that at least temporarily suspends operation of the primary switch array during a sleep mode, causing the reserve capacitor to sustain a voltage at the first output voltage terminal,
wherein the secondary switch array further selectively couples the second inductor's drive terminal to either the charge terminal or the second output voltage terminal,
wherein the secondary switch array includes a first set of switches coupled to the first inductor's drive terminal and a second set of switches coupled to the second inductor's drive terminal,
wherein during the sleep mode the controller suspends operation of the second set of switches while continuing to drive operation of the first set of switches, and
wherein the converter further comprises an auxiliary converter that, during the sleep mode, periodically recharges the reserve capacitor.

4. A current doubling DC-DC converter that comprises:
an output capacitor coupled between a first output voltage terminal and a second output voltage terminal;
a transformer having a primary and a secondary;
first and second inductors coupled together at the first output voltage terminal, the first and second inductors each having a drive terminal coupled to a respective terminal of the transformer secondary;
a reserve capacitor coupled to the second output voltage terminal, the reserve capacitor having a charge terminal;
a primary switch array that operates to convert an input voltage into forward voltage pulses and reverse voltage pulses on the transformer primary;
a secondary switch array that selectively couples the first inductor's drive terminal to the charge terminal and to the second output voltage terminal; and
a controller that at least temporarily suspends operation of the primary switch array during a sleep mode, causing the reserve capacitor to sustain a voltage at the first output voltage terminal,
wherein the secondary switch array further selectively couples the second inductor's drive terminal to either the charge terminal or the second output voltage terminal,
wherein during the sleep mode the controller suspends operation of the secondary switch array, and
wherein the converter further comprises a first auxiliary converter that, during the sleep mode, draws power from the reserve capacitor to sustain the voltage at the first output voltage terminal.

5. The converter of claim 4, wherein the first auxiliary converter is a buck converter.

6. The converter of claim 4, wherein during the sleep mode the controller periodically drives operation of the primary switch array and the secondary switch array to recharge the reserve capacitor.

7. The converter of claim 4, wherein the converter further comprises a second auxiliary converter that, during the sleep mode, periodically recharges the reserve capacitor.

8. A DC-DC conversion method that comprises:
running in an active mode by:
operating a primary switch array to convert an input voltage into forward voltage pulses and reverse voltage pulses on a primary of a transformer having a secondary coupled between a drive terminal of a first inductor and a drive terminal of a second inductor, the first and second inductors each having a common terminal coupled to a first output voltage terminal;
selectively coupling the first inductor's drive terminal to a charge terminal of a reserve capacitor and to a second output voltage terminal, the first inductor's drive terminal being selectively coupled to the charge terminal at least during the forward voltage pulses; and
selectively coupling the second inductor's drive terminal to the charge terminal of the reserve capacitor and to the second output voltage terminal, the second inductor's drive terminal being selectively coupled to the charge terminal at least during the reverse voltage pulses; and
running in a sleep mode by:
suspending operation of the primary switch array at least temporarily; and
while the operation of the primary switch array is suspended, continuing said selective coupling of the first and second inductors' drive terminals to use charge from the reserve capacitor to sustain a voltage on an output capacitor coupled between the first output voltage terminal and the second output voltage terminal.

9. The method of claim 8,
wherein the selective coupling of the first inductor's drive terminal is performed with a first set of switches, and
wherein the selective coupling of the second inductor's drive terminal is performed with a second set of switches.

10. The method of claim 9,
wherein said using charge from the reserve capacitor is performed with the first set of switches, and
wherein running in the sleep mode further includes: suspending operation of the second set of switches at least temporarily.

11. The method of claim 10, wherein running in the sleep mode further includes periodically operating the primary switch array and the second set of switches to recharge the reserve capacitor.

12. The method of claim 9,
wherein said using charge from the reserve capacitor is performed with the first set of switches, and
wherein running in the sleep mode further includes:
suspending operation of the second set of switches, and
periodically recharging the reserve capacitor with a second auxiliary converter.

13. A DC-DC conversion method that comprises:
running in an active mode by:
operating a primary switch array to convert an input voltage into forward voltage pulses and reverse voltage pulses on a primary of a transformer having a secondary coupled between a drive terminal of a first inductor and a drive terminal of a second inductor, the first and second inductors each having a common terminal coupled to a first output voltage terminal;

selectively coupling the first inductor's drive terminal to a charge terminal of a reserve capacitor or to a second output voltage terminal with a first set of switches, the first inductor's drive terminal being coupled to the charge terminal at least during the forward voltage pulses; and selectively coupling the second inductor's drive terminal to the charge terminal of the reserve capacitor or to the second output voltage terminal with a second set of switches, the second inductor's drive terminal being coupled to the charge terminal at least during the reverse voltage pulses; and running in a sleep mode by:

suspending operation of the first and second sets of switches;

suspending operation of the primary switch array at least temporarily; and while the operation of the primary switch array is suspended, using charge from the reserve capacitor to sustain a voltage at the first output voltage terminal, wherein said using charge from the reserve capacitor is performed using a first auxiliary converter.

14. The method of claim 13, wherein running in the sleep mode further includes periodically operating the primary switch array and the secondary switch array to recharge the reserve capacitor.

15. The method of claim 13, wherein running in the sleep mode further includes periodically recharging the reserve capacitor with a second auxiliary converter.

16. A method of manufacturing a current-doubling DC-DC converter, the method comprising:

providing a transformer having a primary and a secondary, the secondary connected between a drive terminal of a first inductor and a drive terminal of a second inductor, the first and second inductors each having a common terminal coupled to a first output voltage terminal;

connecting a first set of switches to the first inductor's drive terminal, the first set of switches operable to selectively couple the first inductor's drive terminal to a charge terminal of a reserve capacitor and to a second output voltage terminal;

connecting a second set of switches to the second inductor's drive terminal, the switches operable to selectively couple the second inductor's drive terminal to the charge terminal and to the second output voltage terminal;

connecting a primary switch array to the transformer primary;

controlling the primary switch array and the first and second sets of switches with a controller having a mode signal that causes the controller to run in an active mode during normal operations and in a sleep mode during low power operations, wherein during the sleep mode, the controller at least temporarily suspends operation of the primary switch array and the second set of switches, and employs charge from the reserve capacitor to sustain a voltage between the first output voltage terminal and the second output voltage terminal; and providing a second auxiliary converter operable during the sleep mode to periodically recharge the reserve capacitor.

17. The method of claim 16, further comprising providing a first auxiliary converter operable during the sleep mode to sustain the voltage at the first output voltage terminal using charge from the reserve capacitor.

* * * * *